US009682587B2

(12) United States Patent
Zhou et al.

(10) Patent No.: US 9,682,587 B2
(45) Date of Patent: Jun. 20, 2017

(54) FABRIC PRINT MEDIA

(75) Inventors: Xiaoqi Zhou, San Diego, CA (US); Lisa A. Underwood, San Diego, CA (US)

(73) Assignee: Hewlett-Packard Development Company, L.P., Houston, TX (US)

( * ) Notice: Subject to any disclaimer, the term of this patent is extended or adjusted under 35 U.S.C. 154(b) by 60 days.

(21) Appl. No.: 14/398,838

(22) PCT Filed: Jun. 4, 2012

(86) PCT No.: PCT/US2012/040753
§ 371 (c)(1),
(2), (4) Date: Nov. 4, 2014

(87) PCT Pub. No.: WO2014/168600
PCT Pub. Date: Oct. 16, 2014

(65) Prior Publication Data
US 2015/0118419 A1    Apr. 30, 2015

(51) Int. Cl.
*B41M 5/52*  (2006.01)
*D06P 5/00*  (2006.01)
*D06P 7/00*  (2006.01)
*D06P 1/52*  (2006.01)
*D06P 1/667*  (2006.01)
*D06P 1/673*  (2006.01)
*B41M 5/50*  (2006.01)
*C04B 20/10*  (2006.01)
*C04B 20/12*  (2006.01)
*D06P 5/30*  (2006.01)

(52) U.S. Cl.
CPC .......... *B41M 5/5227* (2013.01); *B41M 5/506* (2013.01); *D06P 1/525* (2013.01); *D06P 1/5285* (2013.01); *D06P 1/667* (2013.01); *D06P 1/67383* (2013.01); *D06P 5/002* (2013.01); *D06P 7/00* (2013.01); *B41M 5/508* (2013.01); *B41M 5/5245* (2013.01); *B41M 2205/24* (2013.01); *B41M 2205/34* (2013.01); *B41M 2205/38* (2013.01); *C04B 20/10* (2013.01); *C04B 20/12* (2013.01); *D06P 5/30* (2013.01)

(58) Field of Classification Search
CPC ...... B41M 5/502; B41M 5/504; B41M 5/506; B41M 5/508; B41M 5/5218; B41M 5/5245; B41M 5/5281; C04B 20/10; C04B 20/12
See application file for complete search history.

(56) References Cited

U.S. PATENT DOCUMENTS

| | | | |
|---|---|---|---|
| 5,521,002 A * | 5/1996 | Sneed | 428/331 |
| 6,001,137 A | 12/1999 | Alfekri et al. | |
| 6,372,329 B1 | 4/2002 | Graczyk et al. | |
| 6,478,980 B2 | 11/2002 | Nigam | |
| 6,589,633 B1 * | 7/2003 | Ino et al. | 428/195.1 |
| 6,632,485 B1 * | 10/2003 | Tang et al. | 428/32.1 |
| 6,670,001 B2 | 12/2003 | Kohsaka | |
| 6,689,517 B1 | 2/2004 | Kaminsky et al. | |
| 6,841,205 B1 * | 1/2005 | Sismondi et al. | 428/32.27 |
| 7,632,562 B2 | 12/2009 | Nair et al. | |
| 2001/0008911 A1 | 7/2001 | Sharma et al. | |
| 2003/0157303 A1 | 8/2003 | Li et al. | |
| 2003/0172840 A1 * | 9/2003 | Blank | D06P 5/30 106/31.27 |
| 2005/0054527 A1 * | 3/2005 | Iwasaki | B41M 5/3333 503/216 |
| 2005/0245156 A1 | 11/2005 | Cates et al. | |
| 2006/0182903 A1 | 8/2006 | Sakaguchi et al. | |
| 2006/0281849 A1 | 12/2006 | Johnson | |
| 2007/0031615 A1 | 2/2007 | Nair et al. | |
| 2009/0035478 A1 | 2/2009 | Zhou et al. | |
| 2011/0102497 A1 | 5/2011 | Sato et al. | |
| 2011/0169901 A1 | 7/2011 | Pinto et al. | |
| 2012/0116008 A1 * | 5/2012 | Tanaka | B41M 5/52 524/543 |

FOREIGN PATENT DOCUMENTS

| | | | |
|---|---|---|---|
| CN | 1158294 | 9/1997 | |
| CN | 1240716 | 1/2000 | |
| CN | 1717332 | 1/2006 | |
| EP | 0779162 A2 | 6/1997 | |
| EP | 0779162 A3 | 6/1997 | |
| EP | 1040933 | 10/2000 | |
| JP | 2000-303361 A | 10/2000 | |
| JP | 2002-339242 A | 11/2002 | |
| JP | 2002321452 | 11/2002 | |
| WO | WO 2010/074146 A1 * | 7/2010 | B41M 5/50 |

OTHER PUBLICATIONS

International Search Report and Written Opinion dated Dec. 11, 2014, International Application No. PCT/US2012/040753 filed Jun. 4, 2012, Applicant Hewlett-Packard Development Company, L.P. et al.
European Patent Office, European Application No. 12891431.4, extended European Search Report dated Nov. 6, 2015, 6 pages.

* cited by examiner

*Primary Examiner* — Betelhem Shewareged
(74) *Attorney, Agent, or Firm* — Thorpe, North & Western L.L.P.

(57) ABSTRACT

The present disclosure is drawn to fabric print media and a method of coating a fabric substrate to form a fabric print medium. The fabric print medium can comprise a fabric substrate, a primer layer applied to the fabric substrate, and an ink-receiving layer applied to the primer layer. The primer layer can include a film-forming polymer and a phosphorus- or nitrogen-containing compound. The ink-receiving layer can comprise a phosphorus- or nitrogen-containing compound, a cationic metal complex, and non-deformable particles.

18 Claims, No Drawings

FABRIC PRINT MEDIA

BACKGROUND

Different forms of printing, such as inkjet printing, have found various applications on different substrates including traditional cellulose paper, metal, plastic, fabric, and the like. Regarding fabric specifically, challenges related to various printing technologies exist because of the nature of fabric. Some fabrics, for example, can be highly absorptive, diminishing color characteristics, while some synthetic fabrics can be crystalline, decreasing aqueous ink absorption leading to ink bleed. These characteristics result in the image quality on fabric being relatively low. Additionally, black optical density, color gamut, and sharpness are often poor compared to images printed on cellulose paper or other media types. As the moisture sensitivity of images printed on fabric is usually high, images are formed that have poor waterfastness and washability. Further, when fabric is intended to be worn or used in close proximity to the body, as drapes, as overhead signage, as part of furnishings, or the like, there are also concerns about using coatings that increase the flammability of the fabric. Thus, fire retardant characteristics can also be desirable when providing printable fabrics. Durability, such as rubbing resistance, is another concern when printing on fabric, particularly when using pigmented inks. Latex inkjet printing generally provides acceptable results when the printing surface is smooth so that the latex can form a continuous film that bonds the ink pigments together. However, fabric substrates are generally rough. Thick coatings can be used to provide acceptable surface smoothness; however, thick coatings also alter the soft feeling of the fabric, which can be undesirable for consumers.

Obtaining good print characteristics while retaining fabric softness, water resistance, and fire retardant characteristics can be challenging, and providing one or more of these features would be an advancement in the art of printable fabric.

DETAILED DESCRIPTION

In accordance with this, compositions and associated methods described herein are directed generally towards coated fabric substrates for printing, as well as coating compositions used to coat fabrics for printing. Often, fabric does not accurately receive inkjet inks due to bleed, diminished color characteristics, etc., particularly over a wide variety of inks. Additionally, as the moisture sensitivity of fabric leads to poor waterfastness, washability characteristics, fabric softness, etc., by coating fabrics with a multi-layered coating process as described herein, it has been discovered that printing on fabric can be accurate and more permanent, and the resultant fabric can remain soft while providing fire-retardant properties to the fabric.

In accordance with this, a cationic metal complex may be used to improve the print quality and optical density of the image, a phosphorus- or nitrogen-containing compound may provide flame retardancy and flexibility to provide a soft hand feeling of the fabric substrate, and the use of non-deformable particles can provide space for ink to be accepted and allowed to pass through to the primer layer, protecting the ink from damage within the interparticulate space. Other combinations of benefits can also be achieved, depending on the specific components selected for use in combination with one another.

More specifically, the present disclosure is drawn toward a fabric print medium comprising a fabric substrate, a primer layer applied to the fabric substrate, and an ink-receiving layer applied to the primer layer. The primer layer can include a phosphorus- or nitrogen-containing compound and a film-forming polymer, and the ink-receiving layer can comprise a phosphorus- or nitrogen-containing compound, a cationic metal complex, and non-deformable particles.

In another example, a method of coating a fabric substrate to form a fabric media substrate can comprise impregnating a fabric substrate with a primer coating composition to form a primer layer, and drying the primer layer. The primer coating composition can include a liquid carrier, a film-forming primer, and a first phosphorus- or nitrogen-containing compound. The method also includes applying an ink-receiving layer coating composition onto the primer layer to form an outermost ink-receiving layer, and drying the ink-receiving layer. The ink-receiving layer coating composition can include a liquid carrier, a second phosphorus- or nitrogen-containing compound, a cationic metal complex, and non-deformable particles. Optional steps include calendaring the primer layer, the ink-receiving layer, or both layers. Further, in other examples, drying of the primer layer can be carried out under heat at temperature greater than 300° F., and drying of the ink-receiving layer can be carried out under heat at a temperature less than 200° F. The method can also comprise coating both a front side and a back side of the fabric substrate with the primer layer and ink-receiving layer.

It is noted that when discussing the present fabric print media and methods, each of these discussions can be considered applicable to each of these embodiments, whether or not they are explicitly discussed in the context of that embodiment. Thus, for example, in discussing fabric print media, such as discussion is also relevant to the method of preparing the fabric print medium, and vice versa. Further, it is noted that the multi-layered coatings/layers described herein can be understood to comprise structures with significant interface between the respective layers. Thus, in some examples, there may actually be no substantially distinct layers after processing, as the layers form a composite that becomes merged together to form an unevenly distributed structure along a Z-axis of the coating layer(s) defined by the coating thickness.

Turning now to the individual components of the fabric print medium and related methods of the present disclosure, detailed discussion of the film-forming polymer, phosphorus- or nitrogen-containing compounds (in both layers), the cationic metal complex, the non-deformable particulates, and other optional ingredients are provide below. Furthermore, specific discussion of the fabric substrate is also provided as it relates to the fabric media substrate and related methods.

Regarding the fabric substrate, any textile, fabric material, fabric clothing, or other fabric product where there is a desire for application of printed matter can benefit from the principles described herein. More specifically, fabric substrates useful in present disclosure include substrates that have fibers that may be natural and/or synthetic. Examples of fabrics with natural fibers include those with fibers of wool, cotton, silk, rayon, and/or thermoplastic aliphatic polymers derived from renewable resources such as corn starch, tapioca products, or sugarcanes like poly(lactic acid) or polylactide (PLA). Examples of fabrics with synthetic fibers include those with fibers of polyesters, polyamides, polyimides, polypropelene, polyethylene, polystyrene, Polytetrafluoroethylene (TEFLON®), fiberglass, polytrimethylene, polycarbonates, polyester terephthalate, or polybutylene terephthalate. Mixtures and combinations of such natural and/or synthetic fibers can be also used. Any construction of these natural or synthetic fibers can also be used as the fabric substrate, such as materials constructed that are woven, knitted, non-woven, tufted, or the like. Woven textiles can include, but are not limited to, satin, poplin, and crepe weave textiles. Knitted textiles can include, but are not limited to, circular knit, warp knit, and warp knit with a microdenier face. Furthermore, the fabric substrates of the present disclosure can be flat, or may exhibit a pile.

It is notable that the term "fabric substrate" does not include materials commonly known as paper, even though paper can include fibers. Furthermore, fabric substrates include both textiles in its filament form, in the form of fabric material, or even in the form of fabric that has been crafted into finished article (clothing, blankets, tablecloths, napkins, bedding material, curtains, carpet, shoes, etc.). In other words, surface modification coatings of the present disclosure can be prepared and applied to the fabric substrates of the present disclosure in any manner that enables application of the coating composition to the fabric substrate. Such application can be to finished textiles or fabric, or can be applied to textile fibers prior to preparation of the fabric from threads or filaments.

Turning specifically to the coating compositions and resultant coating layers that are formed therefrom, the primer layer coating composition can comprise liquid carrier (water, organic solvent, and/or other liquid additives), a film-forming polymer, and a phosphorus- or nitrogen-containing compound. The film forming polymer can include compounds which can form a continuous film and can have strong binding power to the fabric substrate, such as natural or synthetic macromolecule compounds. In one example, polyurethane compounds can be used, and in other examples, modified polyacrylate compounds can be used, e.g., modified polyacrylates include copolymers of acrylic with methacrylic, acrylic acid, styrene, and anhydride. Yet in other examples, the synthetic polymers such as polyvinyl alcohol and polyvinyl acetate can be used. Further, in another example, nature polymers such as starches and chemically modified starches can be used. These film-forming polymers can be formed by polymerization of organic monomers, inorganic monomers, and hybrids of organic and inorganic monomers. In one example, an organic polymer such as polyurethane or polyacrylate can be grafted with some inorganic unites such as halogen groups, e.g., bromides, fluorides, and chlorides, phosphorus groups, and/or nitrogen groups.

When selecting a film-forming polymer, though not required, low glass transition temperature and high surface energy can be desirable, e.g., Tg ranging from −60° C. to −20° C., and surface energy in the form of a film ranging from 35-50 dyne/cm. This relatively low Tg provides a flexible polymer chain and provides that the polymer will not adversely impact the softness of fabric materials, while these higher surface energies provide acceptable adhesive bonding strength. That being stated, the film forming polymers can be cationic, anionic, or neutral in charge when presented in aqueous or other solution in preparation for application to the fabric substrate as part of a primer layer coating composition. However, in some examples, there are some added benefits to using cationic or neutral compounds, e.g., cationic and neutral film-forming polymers can be included with cationic ink fixer compositions. However, these types of fixers would typically be removed when the film-forming polymer is anionically charged.

The primer layer coating compositions of the present disclosure may also include a phosphorus- or nitrogen-containing compound. The phosphorus-containing compounds can include organic and inorganic phosphates, phosphonates, and/or phoshpinates with different oxidation states. The nitrogen-containing compounds can include melamines (including melamine derivatives) such as melamine, melamine cyanurate, melamine polyphosphate, melem, and melon. The phosphorus- or nitrogen-containing compounds can be used individually in combination each other, or can include compounds that comprise both phosphorus and nitrogen. In some examples, an organophosphate can be used and can be selected from aliphatic phosphates and phosphonates, and aromatic phosphonates. For these examples, organophosphate can be an organophosphonate with four oxygen atoms attached to the central phosphorus; an aliphatic, aromatic, or polymeric organophosphate with 3 oxygen atoms attached to the central phosphorus, or an organophosphinate with 2 oxygen atoms attached to the central phosphorus atom. Formula I below provides a general formula for an organophosphonate, Formula II sets forth an organophosphate that can be aliphatic organophosphate, an aromatic organophosphate, or an organophosphate polymer; and Formula III provides a formulaic example of organophosphinates. Thus, the organophosphates used in accordance with examples of the present disclosure can have general Formula I-III, as follows:

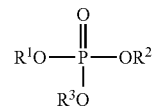

Formula I

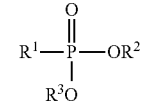

Formula II

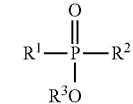

Formula III where $R^1$, $R^2$, and $R^3$ are individually organic or inorganic substituents that can be different or the same, including $C_1$-$C_{12}$ branched or straight chained alkyl, aryl, bisphosphate, or halogen (such as chlorinated or fluorinated substituents). Examples of organophosphates include tris(1,3-dichloroisopropyl)phosphate, tris(2-chloroisopropyl)phosphate, tris(2-chloroisopropyl)phosphate, dimethyl phosphonate, diethyl phosphonate, dimethyl propyl phosphonate, diethyl N,N-bis(2-hydroxyethyl)aminomethyl phosphonate, oligomeric chloroalkyl phosphates, chloroalkyl phosphates, aryl phosphates, or the like.

Compounds having a molecular structure that includes both nitrogen and phosphorus also show acceptable properties. Examples of such compounds include APP (ammonium polyphosphate), PDSPB (poly(4,4-diaminodiphenyl methane spirocyclic pentaerythritol bisphosphonate)), DTPAB (1,4-di(diethoxy thiophosphamide benzene), and mixtures thereof.

The phosphorus- or nitrogen-containing compound can be present, by solids, in the primer layer coating composition on the fabric substrate at a weight ratio of phosphorus- or nitrogen-containing compound to polymer from 99:1 to 70:30, though these ranges are only exemplary and are not intended to be limiting.

It is also notable that all these phosphorus- or nitrogen-containing compounds can be used alone or in combination with one another, or further, in combination with phosphor containing esters to provide desired coating characteristics such as viscosity or improved characteristics of the finished product, including enhanced flame retardancy, flexibility, and/or softness of the fabric substrate.

The primer layer coating composition can be applied to the fabric media substrate by soaking or any other method known in the art. Suitable coating ranges can be from 0.05 gsm to about 20 gsm.

Turning now to the ink-receiving layer coating composition that is used to apply the ink-receiving layer on to the primer layer, this layer can include a cationic metal complex, such as a charged complex ion derived from metal complexes with coordinate covalent bonds or dative covalent bonds. The coordination number is defined by the number of ligand(s) attached to the central metal ion, and typically ranges from two to nine, or even more. In some examples, the ligands can be a small polar molecules, such as $H_2O$ and $NH_3$, and in some examples, the ligands can be anions such as $Cl^-$, $OH^-$ and $S^{2-}$. Often, the metal complex or charged complex ion with associated ligands will be white in color or colorless. Typical examples include $[Al(H_2O)_6]^{3+}$, $[Al(H_2O)_3(OH)_3]$, $[Al(H_2O)_3(OH)_3]$, and $[Al(H_2O)_3(OH)_3]$. Another specific example includes potassium aluminum sulfate dodecahydrate. Alternatively, the metal complex can include two or more central atoms, also referred to as polynuclear complexes, which can be formed when a ligand donates electron pairs to two or more metal ions simultaneously and then acts as bridge between the multiple central ions. In some examples, the charged complex ions can be octa-aquo-dioxodialuminim $(iV)^{4+}$, $Al_8(OH)_{20}^{4+}$, and $[Al_8(OH)_{10}(SO4)_5]^{4+}$. Other types of multivalent salts without similar complex structure as described above may also be used to similar effect. For example, aluminum fluorosulfate and aluminum chloride can also provide acceptable printing characteristics. The inclusion of one of these salts or other similar salt can improve the print quality and optical density of printed areas on fabrics.

The metal complex can be present, by solids, in the coating composition or on the fabric substrate at from 5 wt % to 50 wt %, or from 10 wt % to 40 wt %, though these ranges are only exemplary and are not intended to be limiting.

A second component that can be present in the ink-receiving layer coating composition is a phosphorus- or nitrogen-containing compound. A detailed description of the phosphorus-nitrogen-containing compound is provided above in the description of the primer layer, and this description is incorporated herein. It is noted, however, that the phosphorus-nitrogen-containing compound in the ink-receiving layer need not be the same phosphorus-nitrogen-containing compound that is in the primer layer. Thus, in one example, the organophosphate is the same in the primer layer and the ink-receiving layer, and in another example, the organophosphate is the different in the primer layer and the ink-receiving layer. Thus, any reference to a "first" or a "second" phosphorus-nitrogen-containing compound is purely for convenience, as the first and second phosphorus-nitrogen-containing compound can be the same or different.

The phosphorus- or nitrogen-containing compound can be present, by solids, in the ink-receiving layer coating composition or on the fabric substrate at from 5 wt % to 50 wt %, or from 10 wt % to 40 wt %, though these ranges are only exemplary and are not intended to be limiting.

A third component that can be present in the ink-receiving layer coating composition is the non-deformable particles. More specifically, particles can be selected for use that are non-deformable during manufacturing of the coating composition and storing of the finished fabric media, but can deform or form a film under printing temperature conditions of the printing process. Thus, particles are rigid and can form a porous array, but are also able to coalesce and flow to form a localized film, due at least in part to the rise in temperature during cure processing of printing, provided the temperature of the printing or curing process is above the glass transition temperature (Tg) of the polymer particles.

The non-deformable particles can be reactive polymeric particles or non-reactive polymeric particles. "Reactive polymeric particles" include particles that are capable of cross-linking (either via self-cross-linking, e.g., within a single molecule chain, or among multiple molecule chains, such as in the presence of a cross-linking agent) upon exposure of heat during printing. Under such conditions, the reactive polymeric particles may also coalesce so that the reactive polymer particles flow together to form a film due at least in part to chemical bonding generated in the cross-linking reaction. The cross-linking of the reactive polymer particles can form a continuous, substantially non-porous protective film that is both heat flowed and cross-linked. Thus, in this example, the non-deformable particles can be reactive with a cross-linkable functional group. When this is the case, when there is a rise in temperature during printing or curing processes, the cross-linkable functional group can be activated under the heat and initialize the cross-link reaction. As a result, upon printing, the collapse of the particle and the cross-linking of the cross-linkable functional groups causes the particles coalesce and embed printed ink pigment particles so that they physically interlock with the printed or otherwise deposited ink.

The reactive polymer particles selected are generally not limited, as long as macromolecular chains of the particles are capable of the cross-linking reaction mentioned above. Some specific examples of polymer particles include particles of a polymer having an epoxy functionality on a backbone of the polymer, particles of a polymer having an epoxy functionality on a side chain of the polymer, particles of a polymer having fatty acid groups, particles of a polymer having alkoxy-silane groups, particles of a polymer having acetoacetoxy groups, particles of a polymer having hydroxyl groups, particles of a polymer having amine groups, and particles of a polymer having carboxyl groups.

On the other hand, "non-reactive polymer particles" do not initialize a cross-linking reaction. However, upon exposure to the heat during printing, the non-reactive polymeric particles can coalesce, flowing together to form a film due to the rise in temperature above its glass transition temperature (Tg). The coalescing of the non-reactive polymer particles forms a continuous, substantially non-porous protective film that remains uncrosslinked.

The non-deformable and non-reactive particles can be selected from polymers formed by polymerization and/or copolymerization of hydrophobic addition monomers. Examples of hydrophobic addition monomers include, but are not limited to, $C_1$-$C_{12}$ alkyl acrylate and methacrylate monomers (e.g., methyl acrylate, ethyl acrylate, n-propyl acrylate, isopropyl acrylate, n-butyl acrylate, isobutyl acrylate, sec-butyl acrylate, tert-butyl acrylate, 2-ethylhexyl acrylate, octyl arylate, methyl methacrylate, ethyl methacrylate, n-propyl methacrylate, isopropyl methacrylate, n-butyl methacrylate, isobutyl methacrylate, sec-butyl methacrylate, tert-butyl methacrylate), aromatic monomers (e.g., styrene, phenyl methacrylate, o-tolyl methacrylate, m-tolyl methacrylate, p-tolyl methacrylate, benzyl methacrylate), hydroxyl containing monomers (e.g., hydroxyethylacrylate, hydroxyethylmethacrylate), carboxylic acid containing monomers (e.g., acrylic acid, methacrylic acid), vinyl ester monomers (e.g., vinyl acetate, vinyl propionate, vinylbenzoate, vinylpivalate, vinyl-2-ethylhexanoate, vinylversatate), vinyl benzene monomers, $C_1$-$C_{12}$ alkyl acrylamide and methacrylamide monomers (e.g., t-butyl acrylamide, sec-butyl acrylamide, N,N-dimethylacrylamide), and olefin monomers (e.g., polyethylene, polypropylene, and co-polymers). The non-deformable particles can also be selected from polytetrafluoroethylene (PTFE), silica, silicone, paraffin wax, carnauba wax, montan wax, and combinations.

The ink-receiving layer can further comprise a polymeric liquid binder. Some examples of polymeric liquid binders suitable for use include water-dispersible and water-soluble polymeric compounds, such as polyvinyl alcohol, starch derivatives, gelatin, cellulose derivatives, acrylamide polymers, acrylic polymers or copolymers, vinyl acetate latex, polyesters, vinylidene chloride latex, styrene-butadiene, acrylonitrile-butadiene copolymers, styrene acrylic copolymers, and copolymers and combinations.

The ink-receiving layer coating composition can be applied to the primer layer substrate by soaking or any other method known in the art. Suitable coating ranges can also be from 0.05 gsm to about 20 gsm, though thicknesses outside of this range can also be used.

As latex inks can be used effectively with the fabric media described herein, a latex film-forming agent can optionally be used in the ink-receiving layer. Compounds useful as latex ink film-forming agents are any chemical with suitable water compatibility and temperature volatility that is capable of lowering the elastic modulus of latex ink particulates, providing temporary plasticization to promote polymer chain motion. Representative examples of such materials include citrate or sebacate compounds, ethyoxy alcohols, glycol olegomer and low molecular weight polymers, glycol ether, glycerol acetals, surfactants having a more than 12 carbon backbone (anionic, cationic or non-ionic), and cyclic amide like lactams such as β-lactam, γ-lactam, and δ-lactam, and mixtures thereof. In certain examples, the latex ink film-forming agent can be a cyclic amide like lactam, such as β-lactam, γ-lactam, and δ-lactam, or mixtures thereof. In certain other examples, the latex ink film-forming aid can be a γ-lactam. Representative examples of a γ-lactams include N-methyl-2-pyrrolidone, 5-methyl-2-pyrrolidone, and 2-pyrrolidone.

It is notable that typically, the coating compositions are prepared in a liquid carrier that is used to disperse or solubilize coating composition components. The liquid carrier can be removed, at least in part, from the final product once the coating is applied to the fabric, or can include compounds that remain as solids when a portion of the carrier is removed, through drying. The carrier typically includes one or more of water, cosolvents, surfactants, viscosity modifying agents, inorganic compounds, pH control agents, deformers, or the like. The primary function of the carrier is to dissolve and/or carry the solids or other components that are to remain on the fabric as a coating, and typically, provide a carrier that will suitably carry all the components in the composition and help them uniformly distribute on the fabric surface or the previous coating surface. There is no specific limitation on selection of the carrier components, as long as the carrier as a whole has the function described above.

In further detail regarding the carrier, components that provide added fire retardancy properties (or at least not adding to the flammability of the fabric) can also be desirable for use. Thus, liquid carrier compositions that do not generate char when exposed to fire, and/or which act to block the transfer of fire to the fabric can be considered as desirable carrier components. To provide one example, inorganic compounds such as sodium silicates can be used as part of the carrier, and remains with the primer layer or ink-receiving layer after the liquid carrier is dried to form the respective layers. For example, the composition $SiO_2 \cdot Na_2O$ can be part of the carrier composition (along with water or other liquid components). In this example, the $Na_2O$ can be present in the carrier at from 5 wt % to 15 wt % (e.g., from 9 wt % to 11 wt %); the $SiO_2$ can be present in the liquid carrier from 20 wt % to 40 wt % (e.g., from 30 wt % to 32 wt %); and the balance can be water. In either the primer layer or the ink-receiving layer, the liquid carrier can be used to carry the coating composition components to the fabric media (or to a previously applied layer) to evenly distribute these components to the surface of the fabric. When mixing this liquid carrier, the sodium silicate can be included with the water as a liquid and it can be readily cure into solid film under drying conditions. Thus, to the extent that it remains with the respective coating layer(s) as a solid, it can be considered to be part of the respective coating layer.

The application of the coating composition to the fabric substrate can be carried out using padding procedures generally known in the art. In one example, the fabric substrate can be soaked in a bath and the excess can be rolled out. More specifically, impregnated fabric substrates (prepared by bath, spraying, dipping, etc.) can be passed through padding nip rolls under pressure to provide a wet picked up from 40-60%, though this range is not limiting. The coated fabric after nip rolling can then be dried under heat at any functional drying temperature and drying time.

EXAMPLES

The following examples illustrate some embodiments of the fabric print media and methods that are presently known. However, it is to be understood that the following are only exemplary or illustrative of the application of the principles of the present compositions and methods. Numerous modifications and alternative compositions and methods may be devised by those skilled in the art without departing from the spirit and scope of the present compositions and methods. The appended claims are intended to cover such modifications and arrangements. Thus, while the present recording media and methods have been described above with particularity, the following examples provide further detail in connection with what are presently deemed to be the acceptable embodiments.

Example 1

Preparation of Coated Fabric Substrates

Polyester fabric bases were used to demonstrate the coatings of the present disclosure and their effectiveness as an acceptable substrate for ink printing. Specifically, substrates of 100% woven polyester with a poplin weave structure having a weight of 157 gsm were selected for use. To the fabric bases was applied a primer layer, followed by an ink-receiving layer.

Primer Layer

The primer layer was formulated as a 1 L batch primer coating composition prepared using a lab mixer at room temperature according to the formulations summarized in Table 1. The final solution was adjusted by adding DI water to a solids content of 3 wt %. The individual solids components are provided in parts by weight in Table 1, as follows:

TABLE 1

Primer compositions

| Ingredients | P1 | P2 | P3 | P4 | P5 |
|---|---|---|---|---|---|
| Roven 4040 (neutral film-forming acrylic latex) | 100 | | | | |
| HQ100 (cationic film-forming acrylic latex) | | 100 | | 100 | 20 |
| PrintRite DP375 (aliphatic waterborne film-forming latex anionic to neutral charge) | | | 100 | | |
| AFLAMMIT ™ PE CONC (organophosphate) | 25 | 25 | 25 | 25 | |
| JLS-APP (ammonium polyphosphate) | | | | | 100 |
| BYK dyne 800 (surfactant of alcohol alkoxylates) | 0.5 | 0.5 | 0.5 | 0.5 | 0.5 |
| Cationic fixer | | | | | 5 |

Ink-Receiving Layer

The ink-receiving layer was formulated as a 1 L batch ink-receiving layer coating composition prepared using a lab mixer at room temperature according to the formulations summarized in Table 2. The final solution was adjusted by adding DI water to a solids content of 3 wt %. The individual solids components are provided in parts by weight in Table 2, as follows:

TABLE 2

Ink-receiving layer coating compositions

| Ingredients | IR1 | IR2 (comparative) | IR3 (comparative) | IR4 (comparative) |
|---|---|---|---|---|
| Raycat 82 (non-deformable polyacrylic particles) | 100 | | | 100 |
| HQ100 (cationic film-forming acrylic latex) | | 100 | | |
| Aluminum sulfate Hydrate w/14-18 hydrate groups (cationic metal complex) | 5 | 5 | 5 | |
| Mowiol 40-88 (polyvinyl alcohol) | 5 | 5 | 5 | 5 |
| AFLAMMIT ™ PE CONC (organophosphate) | 25 | 25 | 25 | 25 |
| BYK dyne 800 (surfactant of alcohol alkoxylates) | 0.5 | 0.5 | 0.5 | 0.5 |

Treatment on Fabric

The base fabric was impregnated using the primer compositions of Table 1 and passed through padding nip rollers with a nip pressure about 30 PSI to achieve a wet pick up from 40-60%. The impregnated substrates were then dried in a convection oven at 240° F. to 260° F. with a drying speed of 2 feet per minute to form various primer layers. Next, the ink-receiving coating compositions were applied to various primer layers in the same manner, but with a lower drying temperature, e.g., 150° F. to 160° F. Table 3 below sets forth the various combinations of primer layers and ink-receiving layers prepared in accordance with these preparative steps.

TABLE 3

Fabric print media

| Samples | Primer coating composition | Image receiving layer coating composition |
|---|---|---|
| 1 | P1 | IR1 |
| 2 | P2 | IR1 |
| 3 | P3 | IR1 |
| 4 | P4 | IR1 |
| 5 | P5 | IR1 |
| 6 | P2 | IR2 |
| 7 | P2 | IR3 |
| 8 | P2 | IR4 |
| 9 | None | None |

Example 2

Image Quality and Durability Testing

Once the Fabric Print Media was prepared as described above in Example 1, an identical image sequence was printed on the Fabric Print Media (Samples 1-9) and the Comparative Sample using a HP DesignJet L25500 Printer equipped with HP 789 ink cartridges. The printer was set with a heating zone temperature at about 50° C., a cure zone temperature at about 110° C., and an air flow at about 15%. The following tests were carried out on these printed images:

Image Quality—

Image quality tests were conducted by measuring characteristics such as black optical density, color gamut, and ink bleed. The Black OD (KOD) and color gamut, using XYZ color patches, were measured on Macbeth® TD904 device (Macbeth Process measurement). The image quality of the prints related to bleed was evaluated visually from the printed samples using a scale of 1-5 (with 1 being the worst and 5 being the best).

Ink Adhesion—

Ink adhesion tests were carried out for dry rub resistance and resistance to damage due to folding or creasing of printed images. Specifically, rub resistance testing was carried out using an abrasion scrub tester. The fabrics were printing with small patches of all available colors (cyan, magenta, yellow, black, green, red, and blue). A weight of 550 g was loaded on the test header. The test tip was made of acrylic resin with crock cloth. The test cycle speed was 25 cm/min and 5 cycles were carried out for each sample at an 8 inch length for each cycle. The test probe can be in dry (dry rub) or wet (wet rub) mode, but for this example, dry rub was tested. The damage on the image was evaluated visually using a scale of 1-5 (with 1 being the worst and 5 being the best).

Additionally, a folding/creasing test was conducted which included first printing a test target sized 8 inches×8 inches, 100% of all colors (i.e., a composite black image). Next, the target was folded several times in both MD and CMD directions with the image size facing inwards, followed by a 1 kg/2.2 lb weight being placed on top of the folded image for 20 minutes. After 20 minutes, the target was unfolded and examined front and back for crease marks. The damage on the image was evaluated visually using a scale of 1-5 (with 1 being the worst and 5 being the best).

Water Fastness—

Water fastness was evaluated using three techniques: water drip, water immersion, and detergent washing. Regarding the water drip test, this was conducted by applying DI water on printed samples and observing the water damage on the image. The protocol for the water drip test was as follows: First, 3 inch×3 inch squares were printed, one square for each colorant to be tested (100% density), making sure there was 2-3 inches of white/unprinted material around each printed patch. Next, a lab eye-dropper tool was used to dispense 6-7 drops of DI water into the center of each square. This was repeated immediately for each square and then it was allowed to dry on flat table for several hours to one day. After the drying time was complete, the images were examined for permanent halos/circles forming around the printed patches. Hallowing or circles indicated flowing of additive/surface treatment agents in the material which is unfavorable.

Water immersion was carried out by immersing the printed images in water until completely soaked, and allowing the soaked images to dry.

The protocol for the detergent washing test was first to add 2 gallons of tap water (ambient temperature) into 5 gallon bucket, and then add hand washing soap (e.g., Woolite®) using recommended dosage from the soap supplier. The printed fabric sample was soaked for 5 minute, hand squeezed for 1 with medium force, and then soaked for an additional 5 minutes. Next, the soapy water was dumped out and plain tap water was added (2 gallons) and swished for 1 minute. After drying the damage on the image was evaluated visually using a scale of 1-5 (with 1 being the worst and 5 being the best).

Fire Retardancy—

Fire retardancy was evaluated by Diversified Test Lab Inc, complying with FR Stanford Calif. 1237. The results are summarized using scale of 1-5 (with 1 being the worst and 5 being the best).

Upon conducting these tests, the results were collected and are provided in Table 4 below, as follows:

TABLE 4A

Test Results of Treated Fabric and Comparison

| Samples | Black OD | Color gamut (rounded) | Ink bleed | Dry rub | Folding/ creasing |
|---|---|---|---|---|---|
| 1 | 1.38 | 236,000 | 5 | 4 | 4 |
| 2 | 1.45 | 262,000 | 5 | 5 | 4 |
| 3 | 1.37 | 241,000 | 5 | 4 | 4 |
| 4 | 1.42 | 259,000 | 5 | 5 | 4 |
| 5 | 1.41 | 258,000 | 5 | 5 | 5 |
| 5 (comparative) | 1.40 | 239,000 | 2 | 2 | 4 |
| 6 (comparative) | 1.32 | 229,000 | 4 | 3 | 4 |
| 7 (comparative) | 1.26 | 226,000 | 3 | 5 | 4 |
| 8 (comparative) | 1.04 | 189,000 | 2 | 1 | 4 |

TABLE 4B

Test Results of Treated Fabric and Comparison

| Samples | Water drip | Water immersion | Detergent washing | Fire retardancy |
|---|---|---|---|---|
| 1 | 5 | 5 | 4 | 5 |
| 2 | 5 | 5 | 4 | 5 |
| 3 | 5 | 3 | 4 | 5 |
| 4 | 5 | 5 | 4 | 5 |
| 5 | 5 | 5 | 3 | 4 |
| 6 (comparative) | 4 | 4 | 2 | 5 |
| 7 (comparative) | 5 | 5 | 2 | 5 |
| 8 (comparative) | 2 | 2 | 4 | 5 |
| 9 (comparative) | 1 | 1 | 1 | 1 |

As can be seen by the test results above, the surface modified fabric print media provides several advantages collectively over the comparative sample in terms of ink adhesion, image quality, waterfastness, and fire retardancy. It is noted that though some comparative media coatings performed well in some categories, they performed poorly in others. In accordance with examples of the present disclosure, over all of these tests, performance was generally collectively better when using the coating layers described herein. Specifically, it can be seen that stronger cationic materials provided improved image quality (OD, gamut, etc.), generally. Furthermore, the presence of non-deformable particles in the ink-receiving layer provided improved image quality and durability.

While the disclosure has been described with reference to certain embodiments, those skilled in the art will appreciate that various modifications, changes, omissions, and substitutions can be made without departing from the spirit of the disclosure. It is intended, therefore, that the present disclosure be limited only by the scope of the following claims.

What is claimed is:

1. A fabric print medium, comprising:
   a fabric substrate;
   a primer layer applied to the fabric substrate, the primer layer including a film-forming polymer and a first phosphorus- or nitrogen-containing compound, wherein the film forming polymer is a polyurethane or modified polyacrylate, and wherein the film forming polymer has a glass transition temperature from −60° C. to −20° C. and a surface energy from 35 dyne/cm to 50 dyne/cm; and
   an ink-receiving layer applied to the primer layer, the ink-receiving layer comprising a second phosphorus- or nitrogen-containing compound, a cationic metal complex, and non-deformable particles.

2. The fabric print medium of claim 1, wherein the fabric substrate is woven, knitted, non-woven, or tufted, and the fabric substrate comprises natural or synthetic fibers selected from the group of wool, cotton, silk, rayon, thermoplastic aliphatic polymers, polyesters, polyamides, polyimides, polypropelene, polyethylene, polystyrene, polytetrafluoroethylene, fiberglass, polytrimethylene, polycarbonates, polyester terephthalate, or polybutylene terephthalate.

3. The fabric print medium of claim 1, wherein at least one of the first or second phosphorus- or nitrogen-containing compound is an organophosphate independently selected from the group of:

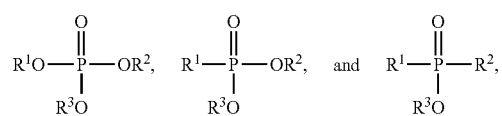

where $R^1$, $R^2$, and $R^3$ are independently $C_1$-$C_{12}$ branched or straight chained alkyl, aryl, bisphosphate, or halogen.

4. The fabric print medium of claim 1, wherein at least one of the phosphorus- or nitrogen-containing compound is selected from the group of tris(1,3-dichloroisopropyl)phosphate, tris(2-chloroisopropyl)phosphate, tris(2-chloroisopropyl)phosphate, dimethyl phosphonate, diethyl phosphonate, dimethyl propyl phosphonate, diethyl N,N-bis(2-hydroxyethyl)aminomethyl phosphonate, oligomeric chloroalkyl phosphates, chloroalkyl phosphates, aryl phosphates, melamines, and mixtures thereof.

5. The fabric print medium of claim 1, wherein at least one of the phosphorus- or nitrogen-containing compound is a phosphorus- and nitrogen-containing compound selected from the group of ammonium polyphosphate, poly(4,4-diaminodiphenyl methane spirocyclic pentaerythritol bis-phosphonate), 1,4-di(diethoxy thiophosphamide benzene), and mixtures thereof.

6. The fabric print medium of claim 1, wherein cationic metal complex comprises i) a charged complex ion comprising coordinate covalent bonds or dative bonds, and wherein the charged complex ion has from 2 to 9 ligands attached thereto; ii) at least two charged complex ions, wherein a ligand donates an electron pairs to the at least two charged complex ions and then acts as bridge between the at least two charged complex ions; or iii) an aluminum-based multivalent salt.

7. The fabric print medium of claim 1, wherein the non-deformable particles are prepared from hydrophobic addition monomers selected from the group of $C_1$-$C_{12}$ alkyl acrylate and methacrylate monomers, aromatic monomers, hydroxyl containing monomers, carboxylic acid containing monomers, vinyl ester monomers, vinyl benzene monomers, $C_1$-$C_{12}$ alkyl acrylamide and methacrylamide monomers, olefin monomers, and combinations thereof.

8. The fabric print medium of claim 1, wherein the non-deformable particles are selected from the group of polytetrafluoroethylene (PTFE), silica, silicone, paraffin wax, carnauba wax, montan wax, and combinations thereof.

9. The fabric print medium of claim 1, wherein the non-deformable particles are reactive polymeric particles that form a cross-linked film when heat is applied thereto.

10. The fabric print medium of claim 1, wherein at least one of the primer layer and the ink-receiving layer comprises a sodium silicate.

11. A method of coating a fabric substrate to form a fabric media substrate, comprising:
impregnating a fabric substrate with a primer coating composition to form a primer layer, the primer coating composition including a liquid carrier, a film-forming primer, and a first phosphorus- or nitrogen-containing compound, wherein the film forming polymer is a polyurethane or modified polyacrylate, and wherein the film forming polymer has a glass transition temperature from −60° C. to −20° C. and a surface energy from 35 dyne/cm to 50 dyne/cm;
drying the primer layer;
applying an ink-receiving layer coating composition onto the primer layer to form an outermost ink-receiving layer, the ink-receiving layer coating composition including a liquid carrier, a second phosphorus- or nitrogen-containing compound, a cationic metal complex, and non-deformable particles; and
drying the ink-receiving layer.

12. The method of claim 11, further comprising the step of calendaring the primer layer, the ink-receiving layer, or both layers.

13. The method of claim 11, wherein drying of the primer layer is under heat at temperature greater than 200° F., and drying of the ink-receiving layer is under heat at a temperature less than 200° F.

14. The method of claim 11, further comprising coating both a front side and a back side of the fabric substrate with the primer layer and ink-receiving layer.

15. The fabric print medium of claim 1, wherein the cationic metal complex comprises an aluminum-based multivalent salt.

16. The method of claim 11, wherein the cationic metal complex comprises an aluminum-based multivalent salt.

17. The fabric print medium of claim 1, wherein the ink-receiving layer further comprises a surfactant having a more than 12 carbon backbone.

18. The fabric print medium of claim 17, wherein the surfactant is a cationic surfactant.

* * * * *

UNITED STATES PATENT AND TRADEMARK OFFICE
CERTIFICATE OF CORRECTION

PATENT NO. : 9,682,587 B2
APPLICATION NO. : 14/398838
DATED : June 20, 2017
INVENTOR(S) : Xiaoqi Zhou et al.

Page 1 of 1

It is certified that error appears in the above-identified patent and that said Letters Patent is hereby corrected as shown below:

In the Claims

In Column 12, Line 54 approx., in Claim 2, delete "polypropelene," and insert -- polypropylene, --, therefor.

Signed and Sealed this
Tenth Day of October, 2017

Joseph Matal
*Performing the Functions and Duties of the*
*Under Secretary of Commerce for Intellectual Property and*
*Director of the United States Patent and Trademark Office*